US009756665B2

(12) United States Patent
Narayanan

(10) Patent No.: US 9,756,665 B2
(45) Date of Patent: Sep. 5, 2017

(54) NETWORK ASSISTED AUTOMATIC DISASTER TRIGGER TO ENABLE DEVICE-TO-DEVICE (D2D) AD HOC COMMUNICATION

(71) Applicant: NOKIA SOLUTIONS AND NETWORKS OY, Espoo (FI)

(72) Inventor: Ram Lakshmi Narayanan, Pleasanton, CA (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/905,587

(22) PCT Filed: Jul. 19, 2013

(86) PCT No.: PCT/US2013/051332
§ 371 (c)(1),
(2) Date: Jan. 15, 2016

(87) PCT Pub. No.: WO2015/009321
PCT Pub. Date: Jan. 22, 2015

(65) Prior Publication Data
US 2016/0165641 A1 Jun. 9, 2016

(51) Int. Cl.
*H04W 48/16* (2009.01)
*H04W 76/02* (2009.01)
(Continued)

(52) U.S. Cl.
CPC ........... *H04W 76/007* (2013.01); *H04W 4/02* (2013.01); *H04W 8/005* (2013.01); *H04W 48/16* (2013.01); *H04W 76/023* (2013.01); *H04W 84/12* (2013.01)

(58) Field of Classification Search
CPC ..... H04W 48/16; H04W 4/02; H04W 76/007; H04W 76/023; H04W 84/12; H04W 8/005
See application file for complete search history.

(56) References Cited

U.S. PATENT DOCUMENTS

| 8,655,844 B1 * | 2/2014 | Wong ................... G06F 21/565 707/638 |
| 2002/0140560 A1 * | 10/2002 | Altman ................... H04W 4/02 340/573.1 |

(Continued)

FOREIGN PATENT DOCUMENTS

| EP | 1772994 A1 | 4/2007 |
| WO | 00/11828 A1 | 3/2000 |

OTHER PUBLICATIONS

International Search Report and Written Opinion dated Oct. 16, 2013, issued in corresponding International Application No. PCT/US2013/ 051332.

*Primary Examiner* — Kashif Siddiqui
(74) *Attorney, Agent, or Firm* — Squire Patton Boggs (US) LLP

(57) ABSTRACT

Systems, methods, apparatuses, and computer program products for automatically switching to D2D communication in a disaster situation is provided. One method includes receiving, by a user equipment, a list of base station sites comprising locations and geographical signal coverage of the base station sites and a list of Wi-Fi access points comprising locations and geographical signal coverage of the Wi-Fi access points. The method may also include creating at least one local database storing information received in the list of base station sites and the list of Wi-Fi access points.

19 Claims, 5 Drawing Sheets

(51) Int. Cl.
*H04W 8/00* (2009.01)
*H04W 76/00* (2009.01)
*H04W 4/02* (2009.01)
*H04W 84/12* (2009.01)

(56) References Cited

U.S. PATENT DOCUMENTS

| | | | |
|---|---|---|---|
| 2003/0040318 A1* | 2/2003 | Fattouch | H04W 16/18 455/446 |
| 2003/0235164 A1* | 12/2003 | Rogers | H04W 64/006 370/331 |
| 2004/0203998 A1* | 10/2004 | Knauerhase | H04W 36/32 455/550.1 |
| 2006/0246896 A1 | 11/2006 | Newberg et al. | |
| 2007/0171910 A1 | 7/2007 | Kumar | |
| 2009/0291664 A1 | 11/2009 | Sandberg et al. | |
| 2010/0035642 A1 | 2/2010 | Iwamura et al. | |
| 2010/0159948 A1 | 6/2010 | Spivey et al. | |
| 2010/0279648 A1* | 11/2010 | Song | H04W 4/22 455/404.1 |
| 2011/0195743 A1* | 8/2011 | Jee | H04W 48/18 455/522 |
| 2012/0246692 A1 | 9/2012 | Ghosh | |
| 2012/0258715 A1* | 10/2012 | Souissi | H04W 36/14 455/436 |
| 2014/0355476 A1* | 12/2014 | Anderson | H04W 24/02 370/254 |

* cited by examiner

NETWORK ASSISTED AUTOMATIC DISASTER TRIGGER TO ENABLE DEVICE-TO-DEVICE (D2D) AD HOC COMMUNICATION

BACKGROUND

Field

Certain embodiments generally relate to communication systems, and for example, to device-to-device (D2D) communication integrated into a communications network, such as long-term evolution (LTE) or long-term evolution advanced (LTE-A) cellular network specified by the 3rd Generation Partnership Project (3GPP).

Description of the Related Art

Two types of communication networks include cellular networks and ad hoc networks. A cellular network is a radio network made up of one or more cells, where each cell is served by at least one centralized controller, such as a base station (BS), a Node B, or an evolved Node B (eNB). In a cellular network, a user equipment (UE) communicates with another UE via the centralized controller, where the centralized controller relays messages sent by a first UE to a second UE, and visa-versa. In contrast, in an ad hoc network, a UE directly communicates with another UE, without the need of a centralized controller. Utilizing a cellular network versus an ad hoc network has certain benefits and drawbacks. For example, utilizing a cellular network over an ad hoc network provides the benefit of easy resource control and interference control. However, utilizing a cellular network over an ad hoc network also provides the drawback of inefficient resource utilization. For instance, additional resources may be required in a cellular network when the two UEs are close to each other, as compared to an ad hoc network.

A hybrid network utilizes both a cellular mode and a D2D transmission mode. In a hybrid network, a UE can choose to communicate either via a cellular mode or a D2D transmission mode. As an example, a hybrid network may allow UEs to communicate either via a cellular mode (i.e., via a centralized controller) or via an autonomous D2D transmission mode where the UEs can establish a channel without the need for a centralized controller. The UE can make this selection depending on which mode provides better overall performance. Thus, a hybrid network can improve total system performance over a cellular network or an ad hoc network. However, in order to utilize a hybrid network, issues related to resource sharing and interference situations may need to be addressed.

In addition, there are some situations in which cellular networks may not be available because they are off-line. For example, in a disaster or catastrophic situation, cellular networks may be knocked off-line for various reasons. However, reliable communications networks may be even more necessary in these disaster situations to help alleviate damage and coordinate emergency responses.

SUMMARY

One embodiment is directed to a method including receiving, by a user equipment, a list of base station sites comprising locations and geographical signal coverage of the base station sites and a list of Wi-Fi access points comprising locations and geographical signal coverage of the Wi-Fi access points. The method may also include creating at least one local database storing information received in the list of base station sites and the list of Wi-Fi access points.

Another embodiment is directed to an apparatus including at least one processor and at least one memory comprising computer program code. The at least one memory and the computer program code configured, with the at least one processor, to cause the apparatus at least to receive a list of base station sites comprising locations and geographical signal coverage of the base station sites and a list of Wi-Fi access points comprising locations and geographical signal coverage of the Wi-Fi access points, and create at least one local database storing information received in the list of base station sites and the list of Wi-Fi access points.

Another embodiment is directed to a computer program, embodied on a computer readable medium. The computer program is configured to control a processor to perform a process including receiving, by a user equipment, a list of base station sites comprising locations and geographical signal coverage of the base station sites and a list of Wi-Fi access points comprising locations and geographical signal coverage of the Wi-Fi access points. The method may also include creating at least one local database storing information received in the list of base station sites and the list of Wi-Fi access points.

Another embodiment is directed an apparatus including means for receiving a list of base station sites comprising locations and geographical signal coverage of the base station sites and a list of Wi-Fi access points comprising locations and geographical signal coverage of the Wi-Fi access points. The apparatus may also include means for creating at least one local database storing information received in the list of base station sites and the list of Wi-Fi access points.

Another embodiment is directed to a method including sending to a user equipment, by an information distribution server, a list of base station sites comprising locations and geographical signal coverage of the base station sites and a list of Wi-Fi access points comprising locations and geographical signal coverage of the Wi-Fi access points. The method may also include sending a list of emergency network access points comprising locations and geographical signal coverage of the emergency network access points to the user equipment.

Another embodiment is directed to an apparatus including at least one processor and at least one memory comprising computer program code. The at least one memory and the computer program code configured, with the at least one processor, to cause the apparatus at least to send, to a user equipment, a list of base station sites comprising locations and geographical signal coverage of the base station sites and a list of Wi-Fi access points comprising locations and geographical signal coverage of the Wi-Fi access points, and to send a list of emergency network access points comprising locations and geographical signal coverage of the emergency network access points to the user equipment.

Another embodiment is directed to a computer program, embodied on a computer readable medium. The computer program is configured to control a processor to perform a process including sending to a user equipment, by an information distribution server, a list of base station sites comprising locations and geographical signal coverage of the base station sites and a list of Wi-Fi access points comprising locations and geographical signal coverage of the Wi-Fi access points. The method may also include sending a list of emergency network access points comprising locations and geographical signal coverage of the emergency network access points to the user equipment.

Another embodiment is directed to an apparatus including means for sending to a user equipment a list of base station sites comprising locations and geographical signal coverage of the base station sites and a list of Wi-Fi access points comprising locations and geographical signal coverage of the Wi-Fi access points. The apparatus may also include means for sending a list of emergency network access points comprising locations and geographical signal coverage of the emergency network access points to the user equipment.

BRIEF DESCRIPTION OF THE DRAWINGS

For proper understanding of the invention, reference should be made to the accompanying drawings, wherein.

DETAILED DESCRIPTION

Figure 1:
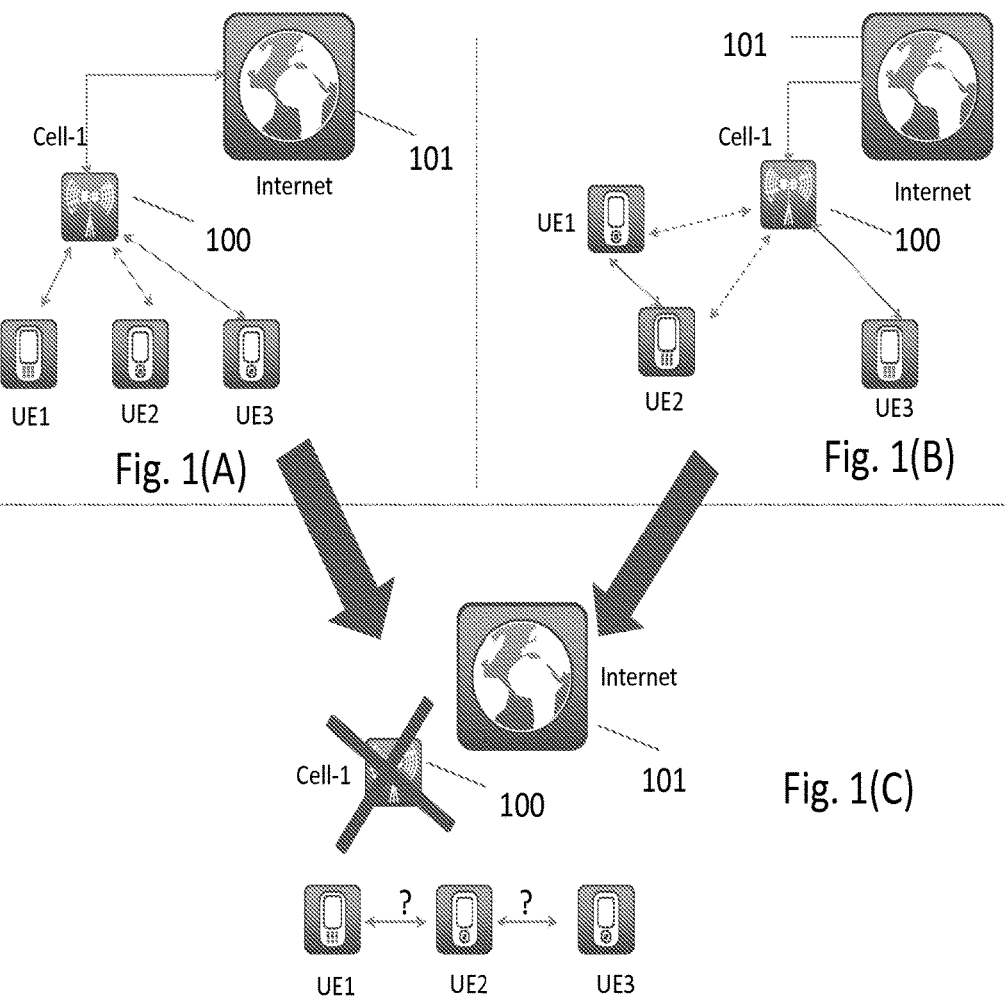
FIGS. 1A-1C illustrate examples of systems, according to embodiments of the invention.

It will be readily understood that the components of the invention, as generally described and illustrated in the figures herein, may be arranged and designed in a wide variety of different configurations. Thus, the following detailed description of the embodiments of systems, methods, apparatuses, and computer program products for enabling the automatic switching to D2D ad hoc mode, as represented in the attached figures, is not intended to limit the scope of the invention, but is merely representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments. Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Disasters are exceptional events that are can be either man made, such as terrorist attacks, or natural disasters, such as earthquakes, hurricanes, tornadoes, wildfires and floods, etc. Disasters create emergency situations, and can cause physical damage as well as social disorder. In these emergency situations, basic provisions and services, such as food, water, shelter, protection and medical help are needed. The effort required to provide these basic services to the victims generally must be coordinated quickly via a reliable communication network.

Prior disaster events provide certain lessons that may be applied to future events. For example, generally, most of the casualties occur within 48 hours after the disaster event. Cellular network towers, communication, and power lines that were present before the disaster may not be operational. As a result, victims or users affected in the disaster area usually are not able to communicate with their families via the usual wired or wireless (e.g., cellular) communication networks. Disaster relief operations take place with help of medical personnel, fire and police departments, and, as a result of the issues noted above, they may have issues establishing reliable communications, which may be established very late.

After a disaster event, proper restoration of infrastructure can take weeks to months. In such situations, victims in the disaster region try to help each other and may form groups among themselves to, for example, search for friends or family and attempt to reach a safe place until proper communication and rescue operations are in place. Victims will likely attempt to use their mobile phones and other wireless or communications devices to try to reach emergency personnel or other victims within the disaster region itself. For example, people may attempt to call emergency service numbers (e.g., 911, 112, 100) using their devices, but when communications networks are not available or damaged, they will not be able to reach anyone and will give up.

D2D communication is currently being standardized in 3GPP as a part of LTE-A standardization efforts. D2D network assisted proximity services are currently being worked out, and D2D standardization is still in the early phase of defining use case(s) and requirements. D2D allows for a hybrid combination of infrastructure-mode and ad hoc communication. As a next step, it is foreseen that emergency services will require D2D ad hoc communication services, and it will become an essential requirement for D2D ad hoc mode communication.

Mobile phones or devices (e.g., UEs) normally connect to a cellular network and provide a visible icon on the display of the phone to indicate the strength of the signal to the user. Similarly, when the mobile device attaches to a Wi-Fi network, a visible icon display on the phone indicates the strength of the signal of the Wi-Fi network. These visible indicators help the user to interact with the device and available services. Switching between networks (e.g., cellular, ad hoc, Wi-Fi) may be done based on the device and user preferences, and is normally performed manually by the users.

However, when a disaster occurs, in order to enable all UEs to switch to D2D ad hoc mode simultaneously, mass switching of all UEs impacted in that area is needed. Hence, embodiments of the present invention provide an additional mode, which may be referred to as emergency mode that is a D2D ad hoc network option for a disaster situation. Switching to the so-called emergency mode may be done automatically by the UEs so as to enable D2D communication for all the affected people in the disaster area.

Certain embodiments provide a set of methods that determine when the UEs need to be switched to D2D ad hoc mode (called emergency mode) with the help of network information that was delivered to each UE during normal operations (i.e., before the disaster event).

FIG. 1 illustrates systems depicting examples of the required communication(s) to enable a mass switching mechanism to assist UEs after a disaster. FIG. 1A illustrates an example of a scenario where UE1, UE2 and UE3 are connected to cellular network, and are able to access services via a base station 100 or cellular tower cell-1. As an example, users of UE1 and UE2 may be respectively known to each other and may be engaged in voice/video/chat conversation. The traffic between UE1 and UE2 is routed via cellular infrastructure, and UE3 is camped onto the same cell and accessing services directly from the internet.

FIG. 1B illustrates an example scenario where the network is enabled to provide network assisted D2D communication services. For instance, in this example, when UE1 and UE2 are in close proximity, with the help of the network in certain situations, may communicate directly between themselves, and keep only control communication with the network. This may be done mainly to improve the capacity of the network. Whereas, in this example, UE3 continues to communicate over the network via base station 100 to the internet 101, for instance.

FIG. 1C illustrates an example scenario immediately after a disaster, according to one embodiment. Based on previous disaster events, it is known that cellular towers and other communication lines are adversely impacted and may no longer be available. Therefore, as depicted in FIG. 1C, base station 100 is knocked offline. This results in survivors (e.g., users trapped inside disaster regions) being stranded with no information and no ability to communicate via their mobile devices (e.g., UE1, UE2, UE3). In most disaster instances, survivors act together before emergency responders arrive to help. For example, victims may form small groups to seek help from each other and to search for their family members or neighbors. In the example scenario of FIG. 1C, UE1, UE2, and UE3 become useless as there is no longer network coverage since base station 100 is knocked offline. This scenario may simultaneously result in the following: (1) D2D proximity discovery that worked in FIG. 1B will not work now, as the UE and its applications terminate connections; and (2) whether it is a licensed spectrum or unlicensed spectrum, they need to identify and allow users to communicate.

Accordingly, a uniform consistent approach is needed to switch all devices in the affected area from network mode (e.g., cellular or Wi-Fi mode) to ad hoc disaster or emergency mode. When there are several hundred (or more) survivors in the same proximity, it is difficult for each user to switch to ad hoc emergency mode manually. Embodiments provide an automatic mechanism that enables devices to automatically switch to the ad hoc emergency mode when required.

In order to switch all of the UEs to ad hoc emergency mode simultaneously, a uniform coordinated mechanism is provided which can consistently detect disaster or emergency events and avoids false triggers. To achieve this, according to one embodiment, a processing entity is provided in the network to supply all required information to the mobile devices.

According to an embodiment, in order to switch all devices (mass) around the same time, supplementary information is made available to the devices prior to switching. This may be done with network assistance when the devices are connected to the network and receiving services. In this embodiment, the devices are configured to prepare and create a local database using relevant information that is easy to collect and distribute to each device with minimal overhead. The data that is pushed to the devices is static and does not change much with respect to geographical location.

Then, based on the information that is provided and stored in the local database of the mobile device, ad hoc emergency mode switching is actually performed by each mobile device automatically. In an embodiment, the mobile devices with the help of received information may implement a machine learning approach to determine that that the device now needs to switch to ad hoc emergency mode.

Figure 2:
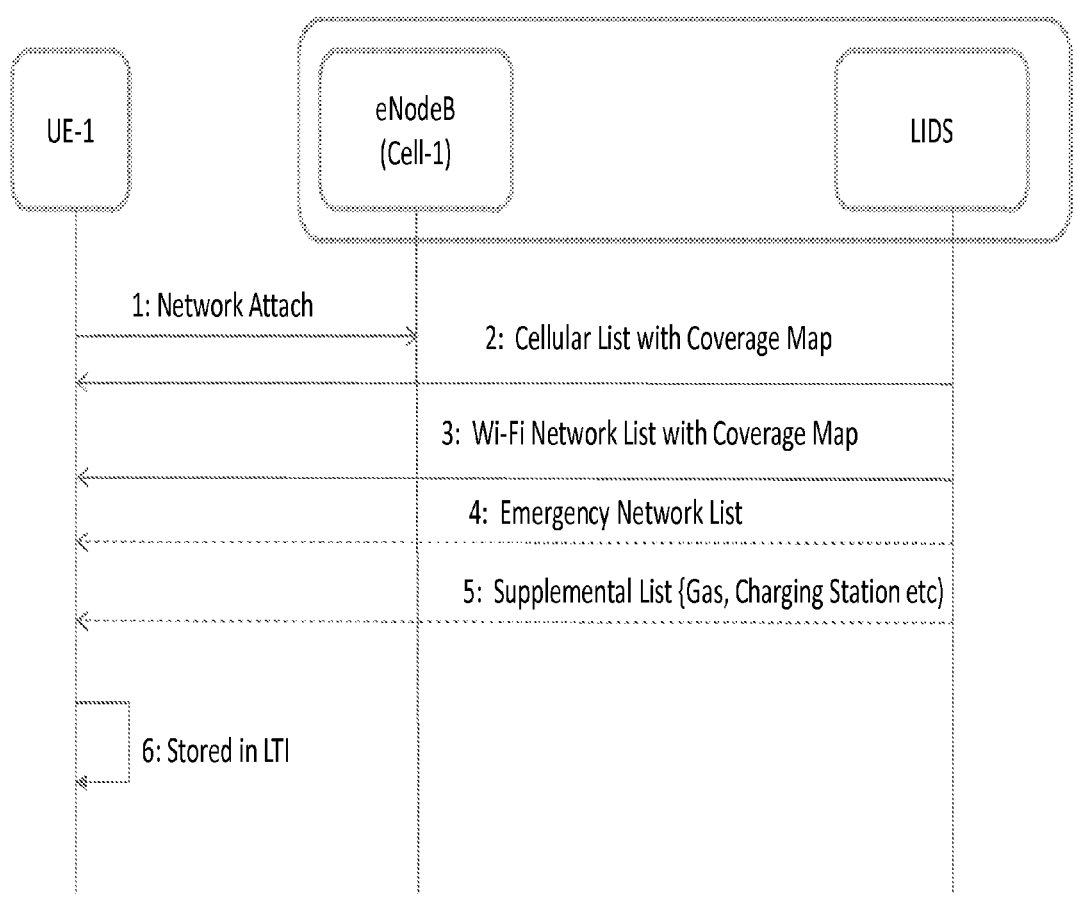
FIG. 2 illustrates an example of a signaling diagram, according to an embodiment.

FIG. 2 illustrates an example of a signaling diagram showing the data distribution, according to one embodiment. For the sake of simplicity, the example of FIG. 2 depicts entities such as eNodeB and UE in LTE; however, it should be noted that embodiments of the invention are not limited to LTE, but are applicable to other types of networks. As illustrated in FIG. 2, in this embodiment, an entity in the network called a Localised Information Distribution Server (LIDS) is introduced. A purpose of LIDS is to collect various pieces of information from existing network repositories and distribute the information to each UE.

As illustrated in FIG. 2, at 1, UE-1 performs network attach and completes the operation. Immediately after network attach or during the end of the network attach, at 2, LIDS prepares a list of cellular towers (i.e., base station sites) and their locations (irrespective of operator), and this list is sent to UE-1. LIDS may also supply the signal coverage over geography. In one embodiment, signal coverage over a geographical region can be retrieved by an operator from an open signals database and supplied to UE-1. The size of the database may only be a few megabytes.

Next, at 3, LIDS prepares a list of Wi-Fi access points and their locations (irrespective of operator) and sends this list to UE-1. LIDS may also supply the signal coverage over geography of the Wi-Fi access points. As mentioned above, signal coverage over a geographical region can be retrieved by the operator from open signal or other suitable database and supplied to the UE-1. It should be noted that the Wi-Fi information may be maintained by operators who support Wi-Fi offloading and also served by many 3rd parties. Also, many of the Wi-Fi or Femto in-building operators provide this information, when a user enters their building for navigation. When the Wi-Fi information is pushed from in building network, this could be stored locally by the UE and later forwarded to LIDS. LIDS may push the information to first responder systems or other UEs when needed.

Generally, the information related to the cellular towers and Wi-Fi access points is static and does not change frequently. Whenever the UE moves to a new coverage region, this information can be pushed. The information can be in the form of maps of the cellular tower locations and their geographical signal coverage, and/or the Wi-Fi access points locations and their geographical signal coverage.

In certain countries, emergency network access points are placed at certain strategic locations. Placement of such towers may be based on historical data (such as identification of disaster safe region(s), etc.). When such information is available via proper interfaces, at 4, LIDS may supply the emergency network access point information to each UE. The database of such information may be only a fraction of megabytes.

At 5, if available, supplementary information such as offline maps, where one can get charging outlets, gasoline, etc. may be supplied by LIDS to the UE-1.

Once all the available information is sent to UE-1 in steps 2-5 discussed above, UE-1 creates a Localized Tower Information (LTI) database, along with a version number and timestamp. UE-1 may also generate a signature for each database.

According to an embodiment, when subsequent location updates or attach happens, only the changes to the information is pushed by LIDS to UE-1. In one embodiment, when UE-1 moves to a new location, then the LTI may be re-created from scratch. The size of LTI is small few megabytes.

According to an embodiment, the UE(s) may use the various information received in FIG. 2 while being served by networks (including Cellular and Wi-Fi) to decide to switch to a D2D ad hoc operation in the event of a disaster. The UE(s) can decide at any given point when to switch to D2D ad hoc mode using license or unlicensed spectrum in a coverage area. However, the UE(s) will initiate the decision to switch when it is not able to attach to any of the network(s) listed in the LTI created by the UE(s).

Figure 3:
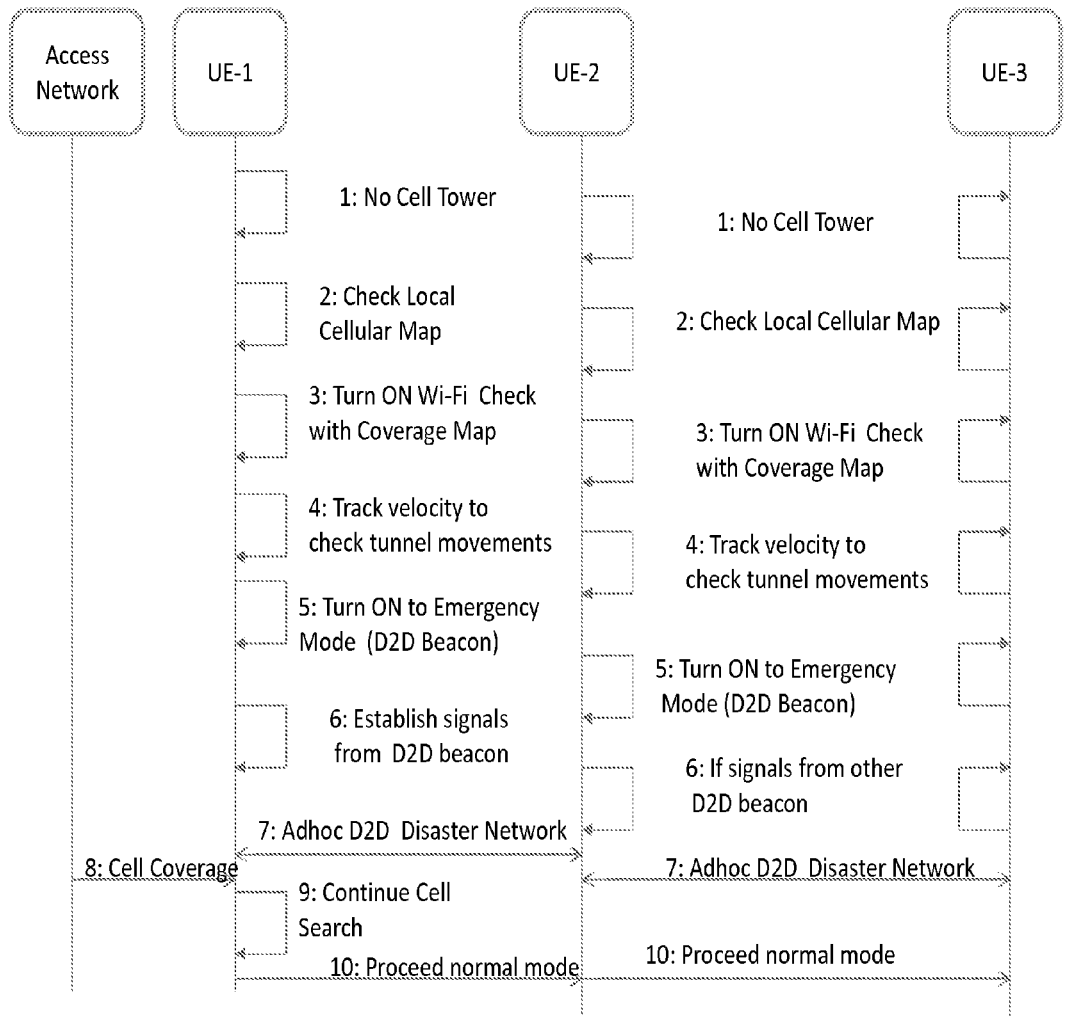
FIG. 3 illustrates an example of a signaling diagram, according to another embodiment.

FIG. 3 illustrates a signaling diagram for simultaneously performing detection and switching to D2D ad hoc mode. The example of FIG. 3 depicts three UEs: UE1, UE2 and UE3. However, embodiments can be applied to any number and type of mobile device, and are not limited to this example. It should be noted that UE1, UE2 and UE3 need not be served by the same operator and need not be in the same coverage area.

In this example, it is assumed that a disaster has occurred and it has disturbed all cell towers that were present before the disaster in that area. As illustrated in FIG. 3, at 1, UE1, UE2 and UE3 that were previously attached to a cell tower detect this absence of cell coverage. The UEs perform a cell search algorithm, and, after completing cell-search, do not find any suitable cell for attach.

After completing the cell search process, at 2, the UE(s) will search their respective LTI databases to try to determine whether any of the towers listed in the LTI database(s) are available. In particular, the UEs may check their current spatial coordinates with the LTI database(s) to see any possible coverage information for that location. To do so, the UEs first collect spatial coordinates of their current location. This can be achieved by using GPS, but this may be an expensive operation as it consumes battery resources. Alternatively, the UEs may use GPS for determining the initial location, and then subsequent movement could be detected with the help of a combination of micro-electrical-mechanical systems (MEMS) present in the mobile device, such as altimeter, barometer, gyroscopes, and/or accelerometer. The UE(s) use their location information and finds coverage map in LID to determine whether at its present location there is any possibility for cell phone coverage.

At 3, if the UE(s) find that there are one or more cell tower(s) from LTI database but cannot not detect any of them, the UE(s) compare its spatial coordinates with LTI database for possible Wi-Fi coverage or in building coverage. In many scenarios, in building cellular coverage is poor (or absent), and therefore Wi-Fi or (femto based) in building coverage is preferable. UE when it looks for spatial coordinates for coverage using in-building coverage map, and checks). This process continues with any other supplementary information provided to the UEs.

To avoid a false trigger, at 4, a validation step is performed to confirm that the UE(s) are not inside an elevator, tunnel, etc. where there may be network blind spots. For example, it may be possible that users are moving inside an elevator or travelling inside a tunnel. Based on the velocity and movement from MEMS components of the UEs and the localized map, it can be determined whether the UEs are in a blind spot region. If this is the case, then the UEs may not perform switching to D2D ad hoc mode.

When the UE(s) have determined that they were in a region where cellular and/or Wi-Fi coverage existed before but it cannot be detected now, at 5, each of the UE(s) decide to switch to D2D ad hoc mode. They turn on either licensed or unlicensed spectrum to discover neighbors and switch to D2D communications.

Then, at 6, the UE(s) establish themselves using D2D ad hoc protocols and perform the D2D ad hoc discovery process. As part of an initial exchange during D2D ad hoc discovery process, each UE provides the time at which it has detected the absence of all signals, and location to each other. With this information, each of the UEs can determine that all the UEs in their vicinity are detecting the absence of cellular and/or Wi-Fi signals at around the same time.

D2D ad hoc mode communication takes places within the disaster area, at 7. The UE(s) may scan, at regular intervals, to check for the return of regular coverage such that the UEs may switch back to normal mode when applicable. This can be done by sampling at certain intervals the UE(s) movements and then determine when there is normal cell coverage.

In the example of FIG. 3, at 8, cellular coverage is restored (or emergency network is established by government agency or first responders). At 9, one or more of the UE(s) detect this return of coverage, and trigger others via D2D ad hoc mode. At 10, each of the UE(s) is switched back from D2D ad hoc mode to normal mode of operations.

Figure 4A:
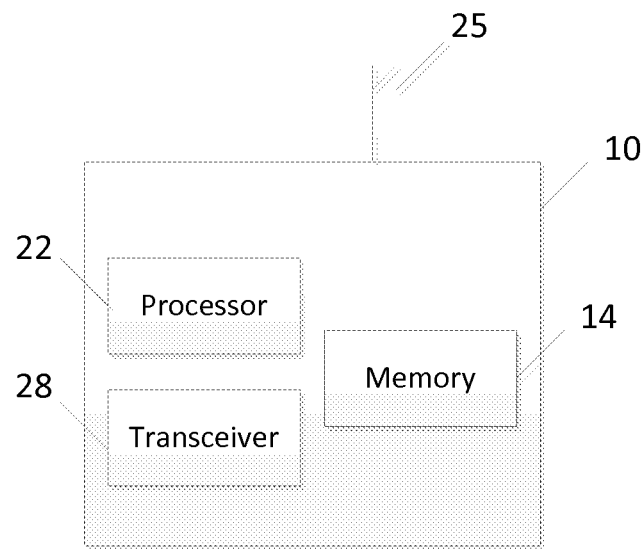
FIG. 4a illustrates an example of an apparatus, according to one embodiment.

FIG. 4*a* illustrates an example of an apparatus 10 according to an embodiment. In one embodiment, apparatus 10 may be a UE or mobile device. For instance, apparatus 10 may be a UE as illustrated in FIGS. 1-3 discussed above. Further, it should be noted that one of ordinary skill in the art would understand that apparatus 10 may include components or features not shown in FIG. 4*a*. Only those components or features necessary for illustration of the invention are depicted in FIG. 4*a*.

As illustrated in FIG. 4*a*, apparatus 10 includes a processor 22 for processing information and executing instructions or operations. Processor 22 may be any type of general or specific purpose processor. While a single processor 22 is shown in FIG. 4*a*, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 further includes a memory 14, which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include one or more antennas 25 for transmitting and receiving signals and/or data to and from apparatus 10. Apparatus 10 may further include a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

In some embodiments, apparatus 10 may include a global positioning system (GPS) receiver configured to calculate a current location of apparatus 10. Additionally, in an embodiment, apparatus 10 may include micro-electrical-mechanical systems (MEMS), such as an altimeter, barometer, gyroscopes, and/or accelerometer, configured to detect subsequent movement(s) of apparatus 10.

Processor 22 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 14 stores software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, apparatus 10 may be a UE or mobile device as discussed above. In this embodiment, apparatus 10 may be controlled by memory 14 and processor 22 to receive a list of base station sites comprising locations and geographical signal coverage of the base station sites and a list of Wi-Fi access points comprising locations and geographical signal coverage of the Wi-Fi access points. In an embodiment, the list of base station sites may be received during or immediately after the apparatus 10 attaches to a network. Apparatus 10 may then be controlled by memory 14 and processor 22 to create at least one local database configured to store the information received in the list of base station sites and the list of Wi-Fi access points. In an embodiment, apparatus 10 may be controlled by memory 14 and processor 22 to generate a version number, timestamp, and a signature for the at least one local database.

According to one embodiment, apparatus 10 may be controlled by memory 14 and processor 22 to receive a list of emergency network access points comprising locations and geographical signal coverage of the emergency network access points, and to store the list of emergency network access points in the at least one local database. In addition, in an embodiment, apparatus 10 may be controlled by memory 14 and processor 22 to receive a supplemental information list comprising, for example, at least one of offline maps, charging station locations, or gas station locations.

In some embodiments, apparatus 10 may be controlled by memory 14 and processor 22 to detect an absence of network coverage and, when the absence of network coverage is detected, to search the at least one local database for base station sites based on current spatial coordinates of the apparatus 10. When the apparatus 10 determines from the search of the at least one local database that there are base station sites that should be available and that the apparatus 10 cannot connect to any of the base station sites, apparatus 10 may be controlled by memory 14 and processor 22 to search the at least one local database for possible Wi-Fi coverage based on the spatial coordinates of the apparatus. Further, in one embodiment, apparatus 10 may be controlled by memory 14 and processor 22 to determine whether the user equipment is in a blind spot region.

When the apparatus 10 determines that the searches of the at least one local database show that there should be base station site and/or Wi-Fi coverage and the apparatus 10 cannot connect to any base station site or Wi-Fi access point thereby suggesting that a disaster has occurred knocking networks offline, apparatus 10 may be controlled by memory 14 and processor 22 to switch to D2D ad hoc communication. In an embodiment, apparatus 10 may be controlled by memory 14 and processor 22 to perform D2D ad hoc discovery process and to exchange, with other D2D user equipment, a time at which the apparatus 10 detected an absence of network coverage and a location of the apparatus 10. According to an embodiment, apparatus 10 may be controlled by memory 14 and processor 22 to check at regular intervals whether the network coverage has been restored, and to switch back to normal mode when the network coverage is restored.

Figure 4B:
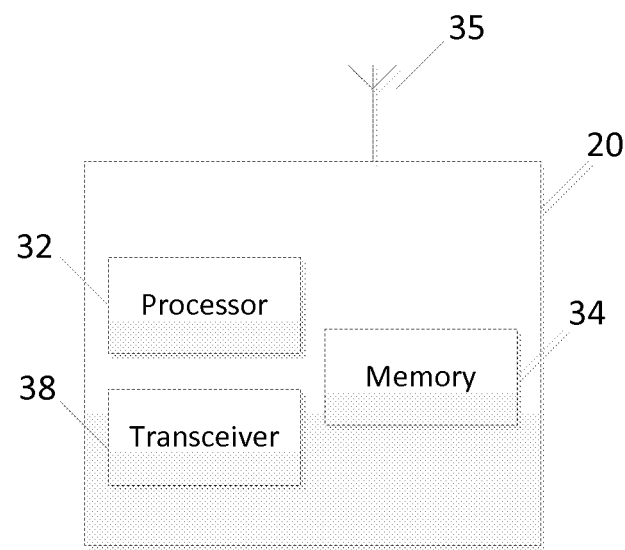
FIG. 4b illustrates an example of an apparatus, according to another embodiment.

FIG. 4b illustrates an example of an apparatus 20 according to another embodiment. In an embodiment, apparatus 20 may be a base station in a communications network, such as an eNB in LTE. It should be noted that one of ordinary skill in the art would understand that apparatus 20 may include components or features not shown in FIG. 4b. Only those components or features necessary for illustration of the invention are depicted in FIG. 4b.

As illustrated in FIG. 4b, apparatus 20 includes a processor 32 for processing information and executing instructions or operations. Processor 32 may be any type of general or specific purpose processor. While a single processor 32 is shown in FIG. 4b, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 further includes a memory 34, which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

Apparatus 20 may also include one or more antennas 35 for transmitting and receiving signals and/or data to and from apparatus 20. Apparatus 20 may further include a transceiver 38 configured to transmit and receive information. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a base station in a communications network, such as an eNB in LTE. In this embodiment, apparatus 20 may be controlled by memory 34 and processor 32 to send, to a user equipment, a list of base station sites comprising locations and geographical signal coverage of the base station sites and a list of Wi-Fi access points comprising locations and geographical signal coverage of the Wi-Fi access points. Apparatus 20 may be controlled by memory 34 and processor 32 to send a list of emergency network access points comprising locations and geographical signal coverage of the emergency network access points to the user equipment.

Figure 5A:
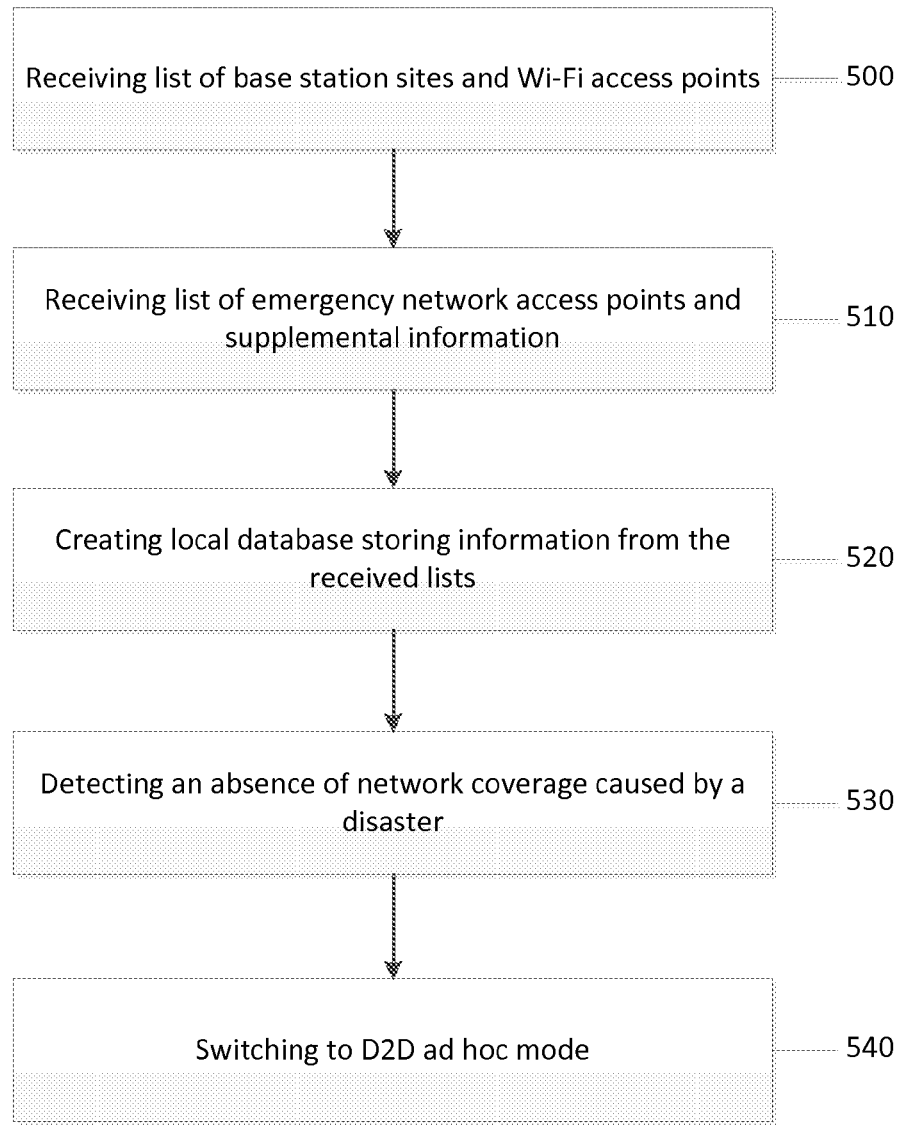
FIG. 5a illustrates an example of a flow diagram of a method, according to one embodiment.

FIG. 5a illustrates an example of a flow diagram of a method, according to an embodiment. The method includes, at 500, receiving, by a user equipment, a list of base station sites comprising locations and geographical signal coverage of the base station sites and a list of Wi-Fi access points comprising locations and geographical signal coverage of the Wi-Fi access points. The method may also include, at 510, receiving a list of emergency network access points comprising locations and geographical signal coverage of the emergency network access points and a supplemental information list. The method may then include, at 520, creating at least one local database storing information received in the lists. The method may further include, at 530, detecting, by the user equipment, an absence of network coverage caused by a disaster. The user equipment can determine that the loss of network coverage is caused by a disaster by cross-checking against the created local database, as outlined above. The method may then include, at 540, switching to D2D ad hoc communication and performing D2D ad hoc discovery process with other D2D user equipment.

Figure 5B:
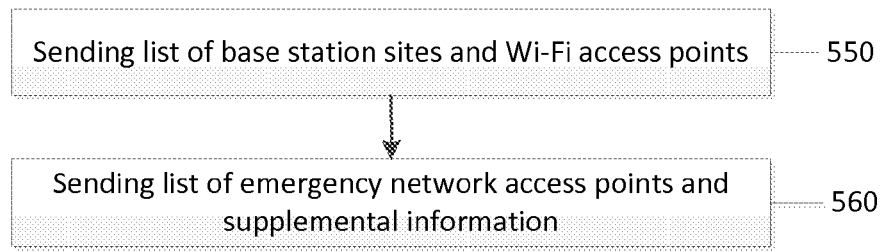
FIG. 5b illustrates an example of a flow diagram of a method, according to another embodiment.

FIG. 5b illustrates an example of a flow diagram of a method, according to an embodiment. The method depicted in FIG. 5b can be performed by LIDS discussed above. The method includes, at 550, sending to a user equipment a list of base station sites comprising locations and geographical signal coverage of the base station sites and a list of Wi-Fi access points comprising locations and geographical signal coverage of the Wi-Fi access points. The method may also include, at 560, sending a list of emergency network access points comprising locations and geographical signal coverage of the emergency network access points and/or a supplemental information list to the user equipment.

In some embodiments, the functionality of any of the methods described herein, such as those illustrated in FIGS. 5a and 5b discussed above, may be implemented by software and/or computer program code stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

As outlined above, embodiments provide a network assisted apriority database information to determine the triggers for switching to D2D emergency ad-hoc mode. In addition, certain embodiments provide a machine learning approach based on recent past information such that, when a disaster occurs, the devices switches automatically to the emergency mode. As discussed above, some embodiments also include a mechanism to avoid false triggers and switches. Embodiments also provide a mechanism for switching back from D2D ad hoc mode to normal mode, when communication infrastructure is restored or the user moves to normal coverage area. Embodiments are applicable for both licensed and unlicensed spectrum, and are compatible with all types of cellular or wireless technology including, but not limited to, 3G, 4G, etc.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. A method, comprising:
   receiving, by a user equipment, a list of base station sites comprising locations and geographical signal coverage of the base station sites and a list of Wi-Fi access points comprising locations and geographical signal coverage of the Wi-Fi access points; and
   creating at least one local database storing information received in the list of base station sites and the list of Wi-Fi access points;
   detecting, by the user equipment, an absence of network coverage;
   when the absence of network coverage is detected, searching the at least one local database for base station sites based on current spatial coordinates of the user equipment; and
   when the user equipment determines from the search of the at least one local database that there are base station sites that should be available and that the user equipment cannot connect to any of the base station sites, searching the at least one local database for possible Wi-Fi coverage based on the spatial coordinates of the user equipment.

2. The method according to claim 1, wherein the receiving comprises receiving the list of base station sites during or immediately after the user equipment attaches to a network.

3. The method according to claim 1, wherein the creating further comprises generating a version number, timestamp, and a signature for the at least one local database.

4. The method according to claim 1, wherein the receiving further comprises receiving a list of emergency network access points comprising locations and geographical signal coverage of the emergency network access points, and the creating further comprises storing the list of emergency network access points in the at least one local database.

5. The method according to claim 1, wherein the receiving further comprises receiving a supplemental information list comprising at least one of offline maps, charging station locations, or gas station locations.

6. The method according to claim 1, further comprising determining, by the user equipment, whether the user equipment is in a blind spot region.

7. The method according to claim 1, wherein, when the user equipment determines that the searches of the at least one local database show that there should be base station site and/or Wi-Fi coverage and the user equipment cannot connect to any base station site or Wi-Fi access point, switching to device-to-device (D2D) ad hoc communication.

8. The method according to claim 7, further comprising performing device-to-device (D2D) ad hoc discovery process and exchanging, with other device-to-device (D2D) user equipment, a time at which the user equipment detected an absence of network coverage and a location of the user equipment.

9. The method according to claim 8, further comprising checking at regular intervals whether the network coverage has been restored, and switching back to normal mode when the network coverage is restored.

10. An apparatus, comprising:
at least one processor; and
at least one memory comprising computer program code,
the at least one memory and the computer program code configured, with the at least one processor, to cause the apparatus at least to
receive a list of base station sites comprising locations and geographical signal coverage of the base station sites and a list of Wi-Fi access points comprising locations and geographical signal coverage of the Wi-Fi access points;
create at least one local database storing information received in the list of base station sites and the list of Wi-Fi access points;
detect an absence of network coverage;
when the absence of network coverage is detected, search the at least one local database for base station sites based on current spatial coordinates of the apparatus; and
when the apparatus determines from the search of the at least one local database that there are base station sites that should be available and that the apparatus cannot connect to any of the base station sites, the at least one memory and the computer program code are further configured, with the at least one processor, to cause the apparatus at least to search the at least one local database for possible Wi-Fi coverage based on the spatial coordinates of the apparatus.

11. The apparatus according to claim 10, wherein the at least one memory and the computer program code are further configured, with the at least one processor, to cause the apparatus at least to receive the list of base station sites during or immediately after the apparatus attaches to a network.

12. The apparatus according to claim 10, wherein the at least one memory and the computer program code are further configured, with the at least one processor, to cause the apparatus at least to generate a version number, timestamp, and a signature for the at least one local database.

13. The apparatus according to claim 10, wherein the at least one memory and the computer program code are further configured, with the at least one processor, to cause the apparatus at least to receive a list of emergency network access points comprising locations and geographical signal coverage of the emergency network access points, and to store the list of emergency network access points in the at least one local database.

14. The apparatus according to claim 10, wherein the at least one memory and the computer program code are further configured, with the at least one processor, to cause the apparatus at least to receive a supplemental information list comprising at least one of offline maps, charging station locations, or gas station locations.

15. The apparatus according to claim 10, wherein the at least one memory and the computer program code are further configured, with the at least one processor, to cause the apparatus at least to determine whether the user equipment is in a blind spot region.

16. The apparatus according to claim 10, wherein, when the apparatus determines that the searches of the at least one local database show that there should be base station site and/or Wi-Fi coverage and the user equipment cannot connect to any base station site or Wi-Fi access point, the at least one memory and the computer program code are further configured, with the at least one processor, to cause the apparatus at least to switch to device-to-device (D2D) ad hoc communication.

17. The apparatus according to claim 16, wherein the at least one memory and the computer program code are further configured, with the at least one processor, to cause the apparatus at least to perform device-to-device (D2D) ad hoc discovery process and exchanging, with other device-to-device (D2D) user equipment, a time at which the apparatus detected an absence of network coverage and a location of the apparatus.

18. The apparatus according to claim 17, wherein the at least one memory and the computer program code are further configured, with the at least one processor, to cause the apparatus at least to check at regular intervals whether the network coverage has been restored, and to switch back to normal mode when the network coverage is restored.

19. A non-transitory computer readable medium comprising a computer program, wherein the computer program is configured to control a processor to perform a method according to claim 1.

* * * * *